G. MOORE.

Devices for Aiding Cutting Goods on Bias.

No. 5,756. Reissued Feb. 10, 1874.

Witnesses.

Arnold Hermann.

Wm C Dey

Inventor.

George Moore by his attorney F. D. Stetson

AM. PHOTO-LITHOGRAPHIC CO. N.Y. (OSBORNE'S PROCESS.)

UNITED STATES PATENT OFFICE

GEORGE MOORE, OF SCOTCH PLAINS, NEW JERSEY.

IMPROVEMENT IN DEVICES FOR AIDING CUTTING GOODS ON BIAS.

Specification forming part of Letters Patent No. 134,918, dated January 14, 1873; reissue No. 5,756, dated February 10, 1874; application filed January 2, 1874.

*To all whom it may concern:*

Be it known that I, GEORGE MOORE, of Scotch Plains, Union county, New Jersey, have invented certain Improvements in Apparatus for Aiding in Cutting Goods on the Bias, of which the following is a specification:

The following is a description of what I consider the best means of carrying out the invention:

I construct a right-angled triangle with three bars, the diagonal bar of which is a straight-edged bar or ruler armed with fine teeth or points, which teeth hold the goods against slipping under the knife. The cutting may be done by an ordinary knife held in the hand and slid along the edge of the ruler.

The accompanying drawing forms a part of this specification.

Figure 2:
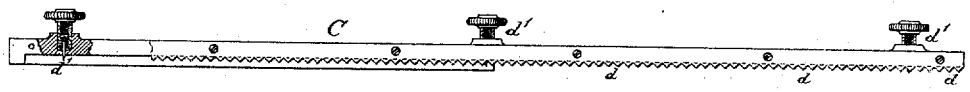
Figure 1:
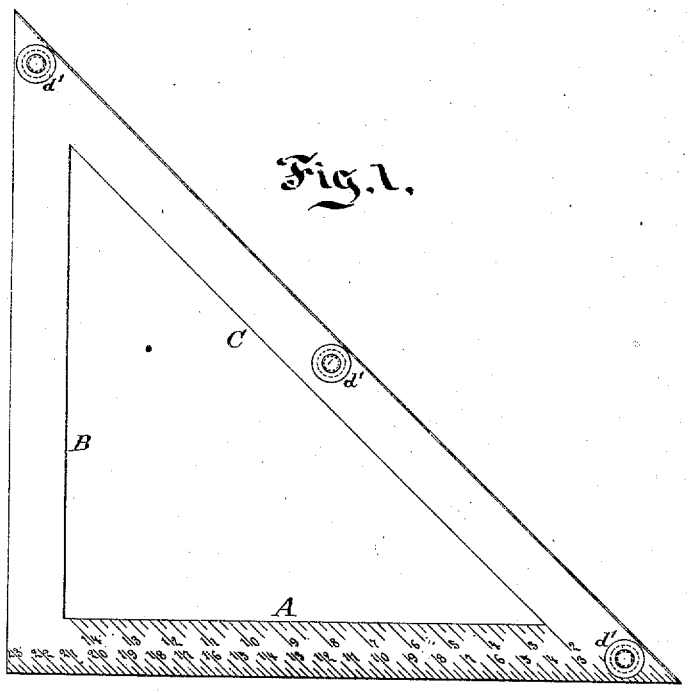

Figure 1 is a plan view, and Fig. 2 is an edge view, as seen from the oblique side. It is partly in section.

Similar letters of reference indicate like parts in both the figures.

A and B are bars or arms fixed rigidly at right angles to each other. The bar A may be of the same thickness as the other parts of the device, so as to lie level, or may be made so much thicker that it will bear against the edge of the table or cutting-board, on which, it will be understood, the material to be cut is to be laid or stretched. C is a diagonal bar, firmly fixed, forming a permanent part of the device; and *d d'* are fine teeth set therein, so as to protrude their points on the under face. The lower bar A is graduated into inches or other convenient units, measured at right angles to the bar C and produced parallel thereto. The outer edge of the diagonal bar C is faced with brass, or with steel, which is thickly studded with the teeth *d* on its lower edge.

The device is operated with the left hand, while the right hand of the operator grasps a smooth-bladed knife. The device, being placed in position with its lower bar A parallel to the edge of the material to be cut, or, in case the thicker arm is used, bearing against the edge of the table or cutting-board, is pressed down firmly upon the material, so that the points or teeth *d d'* enter and take hold of it. The knife is then slid along the outer edge of the bar C. The device is now lifted, moved along the proper distance, and, being again pressed down, the knife is again operated.

A little practice enables an operator of ordinary skill to cut with great uniformity and rapidity.

The points *d d'* perform a highly useful function by holding the goods against drawing and wrinkling. Muslin or other fabrics may be laid or stretched in several thicknesses, so that each movement of the knife cuts off not only one bias-piece, but six or other greater or less number.

The main teeth or points *d* may be either fixed or adjustable. The points *d'* are extensions of larger parts, which are formed with screw-threads, and adapted to be very easily set to project the variable extents. It is well to adjust the extent to which the points *d'* project beyond the face of the device according to the thickness of the goods and the number of thicknesses which it is intended to treat at once.

I propose to graduate the lower edge of the lower arm A with inches and parts of an inch measured along the edge. These graduations will correspond with the ordinary ones, except that the lines should preferably be engraved in oblique positions. The upper edge is to be graduated with a different scale, which shall exactly indicate not the distance along the edge of the goods, but the true width of the strip when cut.

I claim as my invention—

1. A bias rule or measure provided with bias graduations, as described, adapted for marking on the edge of the goods the width of the bias, as specified.

2. The bar A, carrying bias graduations, in combination with the bars B and C, as specified.

3. The points *d d'* on the diagonal bar C, in combination with the bars B and A, as specified.

4. The device for bias cutting described, having the frame A B C provided with the points *d d'*, and having the bar A adapted to serve as a guide for placing it in position, as herein specified.

In testimony whereof I have hereunto set my hand this 28th day of October, 1873, in the presence of two subscribing witnesses.

GEORGE MOORE.

Witnesses:
WM. C. DEY,
ARNOLD HÖRMANN.